United States Patent [19]

Purcell

[11] Patent Number: 5,001,306

[45] Date of Patent: Mar. 19, 1991

[54] DISTRIBUTED OPTICAL FIBER DEVICE FOR DIGITIZER TABLET

[75] Inventor: Alexander M. Purcell, Guilford, Conn.

[73] Assignee: Summagraphics Corporation, Seymour, Conn.

[21] Appl. No.: 480,869

[22] Filed: Feb. 16, 1990

[51] Int. Cl.$^5$ .............................................. G08C 21/00
[52] U.S. Cl. ........................................ 178/18; 173/19; 173/18; 362/33; 362/92
[58] Field of Search ...................... 178/18, 19; 362/32, 362/33, 97

[56] References Cited

U.S. PATENT DOCUMENTS

| | | |
|---|---|---|
| 1,800,452 | 4/1931 | Karnasch . |
| 2,035,998 | 3/1936 | Thompson . |
| 2,563,191 | 8/1951 | Russ . |
| 2,775,687 | 12/1956 | Cushman . |
| 3,062,441 | 11/1962 | Martin . |
| 3,444,385 | 5/1969 | Paglee . |
| 3,535,537 | 10/1970 | Powell . |
| 3,576,430 | 4/1971 | Fickenscher et al. . |
| 3,692,383 | 9/1972 | Herod et al. . |
| 3,864,034 | 2/1975 | Yevick . |
| 4,053,206 | 10/1977 | Yevick . |
| 4,082,029 | 4/1978 | Rumer, Jr. et al. . |
| 4,141,058 | 2/1979 | Mizohata et al. . |
| 4,151,582 | 4/1979 | Grumberger . |
| 4,234,907 | 11/1980 | Daniel . |
| 4,389,698 | 6/1983 | Cibie . |
| 4,460,940 | 7/1984 | Mori . |
| 4,471,412 | 9/1984 | Mori . |
| 4,484,179 | 11/1984 | Kasday . |
| 4,531,230 | 7/1985 | Brogardh . |
| 4,578,674 | 3/1986 | Baker et al. ...................... 118/18 X |
| 4,695,831 | 9/1987 | Shinn ...................................... 178/18 |
| 4,754,372 | 6/1988 | Harrison . |
| 4,761,637 | 8/1988 | Lucas et al. . |
| 4,777,329 | 10/1988 | Mallicoat ............................ 178/18 |
| 4,777,482 | 10/1988 | Kaneko et al. . |
| 4,803,737 | 2/1989 | Sato et al. . |

Primary Examiner—Stafford D. Schreyer
Attorney, Agent, or Firm—Rosen, Dainow & Jacobs

[57] ABSTRACT

An optical device comprising a sheet of optical fibers having different lengths so that the fiber ends are distributed uniformly over a given area. The device is mounted in a digitizer tablet above or below its electrode array. When light is pumped into the free fiber ends, a pattern of light spots are formed which can be spread out to illuminate the tablet's working surface. When driven by a light pen, a similar optical device can be used to locate the light pen for menu-picking functions.

26 Claims, 5 Drawing Sheets

DISTRIBUTED OPTICAL FIBER DEVICE FOR DIGITIZER TABLET

This invention relates to an optical fiber device for digitizer tablets, to digitizer tablets which are surfacelit or backlit, and to digitizer tablets using a light pen.

BACKGROUND OF THE INVENTION

Digitizer tablets are well known in the art. Reference is made to the January, 1989 issue of Byte Magazine, page 162–174, which describe different kinds of currently available digitizers. Most digitizers nowadays rely on room illumination as the light source for the tablet surface. There are however digitizer tablets known as surfacelit or backlit tablets. These are for the most part used, in a variety of sizes of active work areas, in applications requiring high resolution and superior accuracy, such as for accurate tracing of drawings and/or CAD or CAM applications. However, known surfacelit or backlit tablets tend to be expensive, bulky, and of heavy weight. There is thus a need in the art to provide a surfacelit or backlit digitizer which is of significantly smaller size and bulk and of reduced cost.

Known digitizer tablets frequently supply menu-picking capabilities. A menu template is placed over the tablet, the tablet switched into its menu-picking mode, and then the normal pointing device, typically a stylus, is used as a mouse to point to various menu items. The tablet electronics, when told it is in the menu-picking mode, typically uses software or a look-up table to associate the stylus location with the various menu items, and then branches to a subroutine to execute the user's choice. This, however, has the disadvantage that the user has to switch from normal tablet mode to the menu-picking mode in order to select a menu item. There is thus a need in the art for a digitizer tablet that can always be maintained in its normal mode, yet enable a user to make and execute a menu choice.

SUMMARY OF THE INVENTION

An object of the invention is an optical device that can be used to surface light or back light the active area of a digitizer tablet.

Another object of the invention is a surfacelit or backlit digitizer tablet of low weight and of low cost manufacture.

A further object of the invention is an optical device that can be employed with a digitizer tablet to provide it with menu-picking capabilities.

In accordance with one aspect of the invention, a sheet of fiber optic elements is provided. The fiber optic elements are divided into a plurality of segments, with each segment containing different lengths of optical fibers terminating at ends from which light can emanate or enter the optical fiber. The optical fibers are arranged with respect to the digitizer tablet such that the optical fibers' terminating ends are distributed substantially uniformly throughout the region under or within the active area of the tablet.

In accordance with another aspect of the invention, the optical device further comprises a plate-like member that has a plurality of openings or channels each sized to accommodate an optical fiber which is extended into the channel from an edge of the plate-like member. The plate-like member is transparent (clear) or translucent. Each channel terminates at a different point underneath a major surface of the plate-like member. At the channel terminations are located means for bending light, preferably a small reflector. The channel termination points form optical spots distributed substantially uniformly underneath a defined area of the member's major surface.

In accordance with a first preferred embodiment of the invention, the above-described optical device is used in a surfacelit digitizer tablet. In this use, the plate-like member with assembled optical fibers is positioned above the normal grid or electrode array of the tablet, with light diffusing means positioned above the member. Light is then pumped into the free ends of the fibers. The light is transmitted along each of the fibers to their end, and reflected upward to form a broad area active light source composed of a two-coordinate-axes distribution of light spots which due to light diffusion and spreading will form a substantially uniform light source extending under the active working surface of the tablet.

In accordance with a second preferred embodiment of the invention, the optical device of the invention is used in a backlit digitizer tablet. The construction is similar to that described for the surfacelit tablet, except that fewer light spots are formed but with larger diameter fibers and thus of larger size, and the light source is positioned underneath the electrode array.

In accordance with a third preferred embodiment of the invention, the optical device of the invention is employed to provide a tablet with menu-picking functions. In this application, the optical device is positioned underneath the tablet's working surface. A light pen is used to make menu selections by pointing at a menu item and flashing the light pen. The pen light is transmitted down to the optical device and enters the channels at their optical termination points, and is then piped down the associated fiber to a detector located at its free end.

SUMMARY OF DRAWINGS

These and further features and advantages of the invention will become apparent from the detailed description that follows of several exemplary embodiments of the invention, taken in conjunction with the accompanying drawings, wherein.

DETAILED DESCRIPTION OF PREFERRED EMBODIMENTS

In the typical prior art digitizer tablet, an electrode array is provided extending parallel to and below the tablet surface and interacts with a pointing device, for convenience hereinafter referred to as a stylus or cursor, to generate by way of electromagnetic, electrostatic or other phenomenon electrical signals representative of the X and Y coordinate positions of the stylus on the tablet surface. It will be understood that most tablets are designed, in order to remain within resolution and accuracy specifications, to cooperate with a stylus whose proximity from the surface does not exceed a given value, known as the out-of-proximity value. Especially when electrical or magnetic fields are involved in the interaction, which fields spread with distance, is it necessary to specify the stylus proximity from the tablet before it stops transferring coordinate data.

In order to improve the illumination of the tablet surface during use, especially for accurate tracing of drawings or in a CAD or CAM application, it is known to back light the surface by providing underneath the active tablet surface a source of light, typically fluorescent lamps. It also has been suggested to surface light the tablet surface.

It is also known to add a menu-picking function to the tablet. This is accomplished by providing a menu overlay on the tablet surface and switching the tablet to its menu picking mode. In this mode, the tablet can still sense stylus location electronically, but now the signals are interpreted by software to mean menu choices made by the user. Thus, in the known tablets, either the tablet is used to generate X-Y coordinate data, its normal function, or is used in a menu-picking mode for, for instance, configuring the tablet or activating certain drivers or other software. The tablet cannot simultaneously perform such functions because both rely on the same interaction between the cursor and the electrode array.

Among the novel features of the invention is a novel optical device which can be used in one arrangement to surface-light the tablet surface, in another arrangement to back-light the tablet surface, and in still another configuration as an optical menu-picking device which will not interfere with the tablet's normal use to generate X-Y coordinates of the location of a pointing device. These various uses will be best understood from the following description of a conventional digitizer tablet.

Figure 7A:
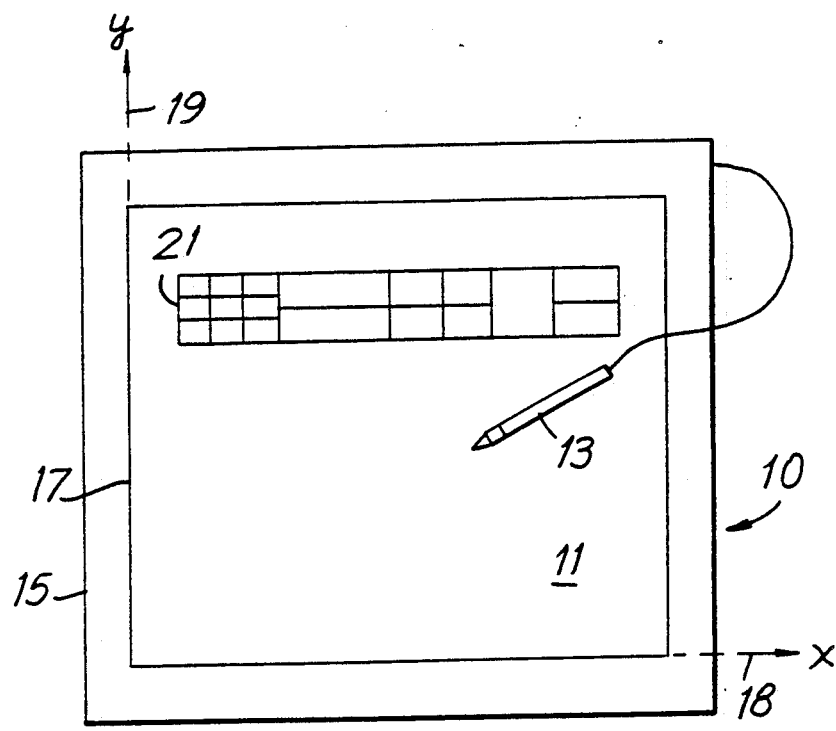
FIGS. 7A and 7B are schematic plan and side views of a digitizer tablet to illustrate various features of the invention.
Figure 7B:
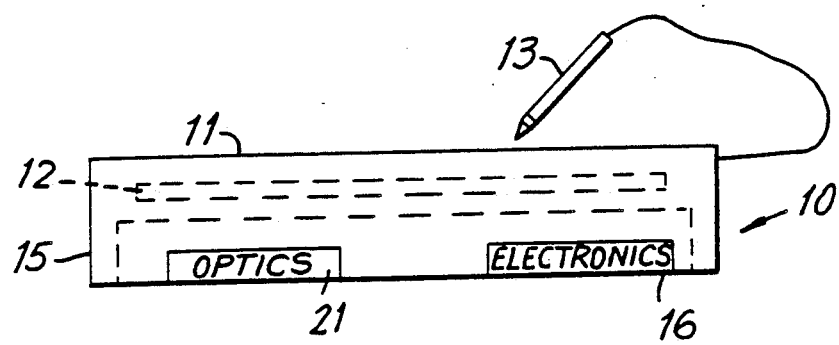

Referring now to FIGS. 7A and 7B in which a digitizer tablet 10 is schematically shown in plan and side views, respectively, the surface of this tablet is referenced 11 and beneath that surface, shown only schematically at 12, is the electrode pattern commonly employed in such digitizers of which examples, which are not to be considered as limiting, are described in commonly-assigned U.S. Pat. Nos. 3,735,044; 3,904,822; and 4,788,386. A stylus that is electrically connected or plugged into the tablet 10, is shown schematically at 13. The grid array 12 is housed within a housing 15 which contains the usual electronics, indicated at 16, which drives the array 12 and cursor 13 to generate electrical signals representative of the stylus position over the active area of the tablet 10. The active area is designated by the rectangle 17 and corresponds approximately to the area of the electrode array 12. Typical active areas generally range from 12 by 12 inches to 42 by 60 inches.

When the common electromagnetic technology is employed, the stylus 13 contains an inductive coil which is in inductive relationship with the wires of the electrode array. There are two typical operating modes which is built into the tablet, in hardware and/or software. The first, called cursor-driven, passes a high-frequency current through the cursor coil, which induces voltages in the wires of the underlying grid array. In one popular technique, the wires are then scanned in succession to produce a time-dependent signal waveform which when processed in the known way enables identification of the position of the cursor 13 relative to the electrodes, and this information in the form of the X-Y coordinates of the cursor location can be output to a computer for use by application software. The other common mode is called grid-driven, in which case the grid wires are successively scanned with a high-frequency signal which inductively couples to the cursor coil and the output from the cursor 13 can be processed to generate the X-Y coordinate data. The latter is typically in absolute units measured from the origin of an X-Y coordinate system as indicated at 18 and 19 which is registered with the tablets' active area 17.

Many of such tablets also provide a menu-picking mode, by switching the tablet to a different set of software routines. In this mode, a transparent overlay, indicated schematically at 21, is laid on the surface 11 at a prescribed location. The overlay has menu choices indicated by the small rectangles. When the user touches the stylus 13 to one of those rectangular areas, then the hardware and software knows that if the stylus X-Y coordinates are within certain ranges, then particular menu choices have been executed by the user. All of the above are well known in the art and further description thereof is unnecessary. An important fact from this brief operational description is that, in this known device, it is the electrical interaction between the pointing device and electrode array that enables the generation of the X-Y coordinate data, and it also the same electrical interaction that enables implementation of the menu choices. Hence, when the tablet is placed by the user in its normal operational mode, it will generate X-Y coordinate data, but cannot implement menu choices, whereas when placed in its menu-picking mode, it cannot generate X-Y coordinate data. One of the features of the invention is to add an optical system 21 to the tablet so that the tablet can exercise both modes, even at the same time if desired, since the X-Y coordinate position determination will still be determined electronically as before, with the menu choices now being dependent upon an optical array located within the enclosure 15.

Figure 1A:
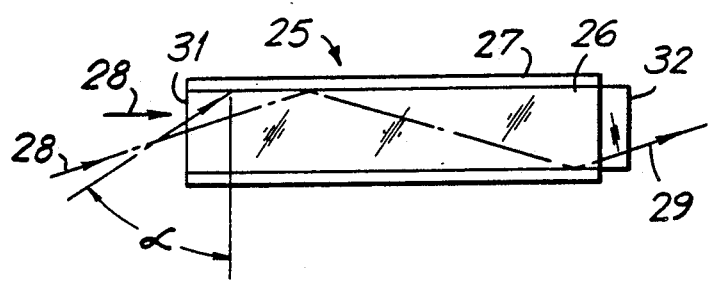
FIGS. 1A and 1B are, respectively, side and end views of a typical optical fiber for illustrating their use in the invention.
Figure 1B:
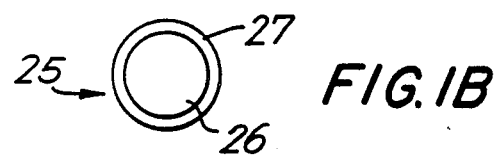

This novel optical interaction uses optical fibers. To understand how the invention operates, a brief review of the optical properties of an optical fiber will be helpful. FIGS. 1A and 1B illustrate a typical known fiber 25, comprising a core 26 of a relatively high refractive index surrounded by a cladding 27 of a lower refractive index. When light 28 is introduced at one end 31 of such a fiber such that the light impinges upon the interface between the two materials of difference refractive indices at a angle of incidence exceeding the critical angle, the light is totally-reflected and propagates down the fiber to its opposite end 32 from which it can emerge, indicated at 29. The critical angle is indicated in FIG. 1A by $\alpha$, and for commercially available fibers is about 60°. High quality fibers are typically made of fused silica, and low-cost fibers of glass or clear plastic. The fibers 25 are available from several suppliers as individual fibers, or as a sheet of fibers, in various diameters ranging from about 0.25 mm-3.0 mm in diameter, and with a sheet of fibers up to 10 cm wide. The invention uses these fibers or sheets in a novel configuration for lighting the active tablet surface 11 or for optically interacting with the stylus 13.

Figure 2:
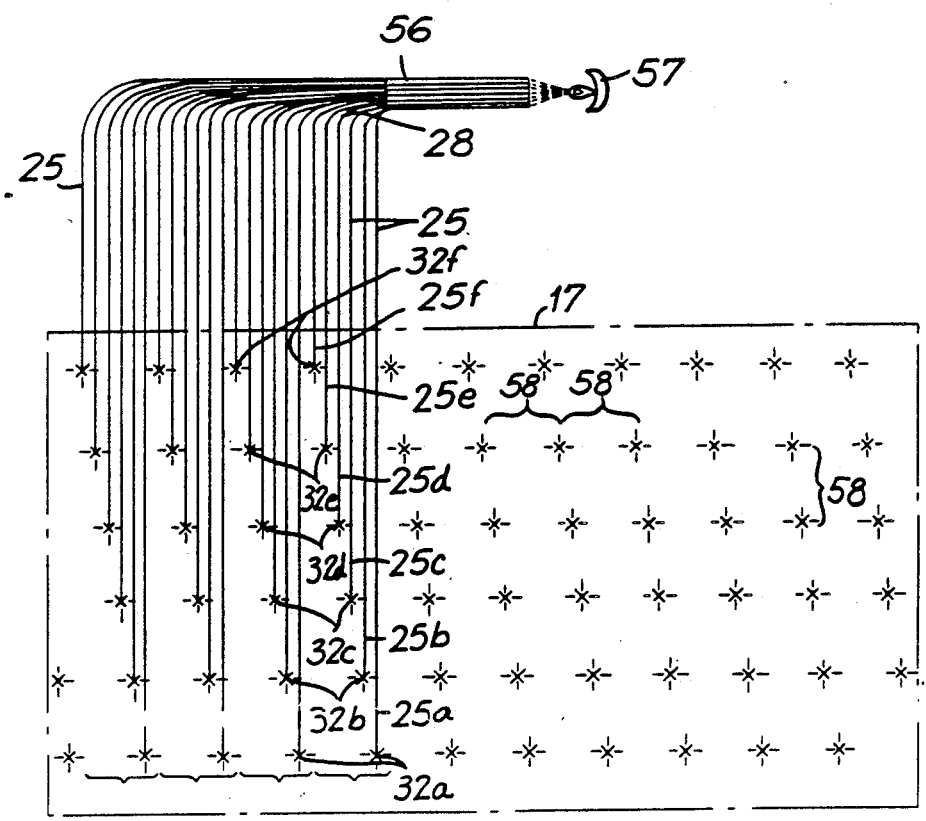
FIG. 2 is a schematic plan view of one form of digitizer tablet in accordance with the invention in which an optical device is used for lighting the active surface of the tablet.

The basic concept of the invention is illustrated in FIG. 2, which shows a portion of the active tablet area, here also designated 17, viewed from the top. A plurality of optical fibers 25 have end portions 25a–25f extending under the active area of the tablet. The fibers, of which only 24 are shown for clarity, would be arranged so that they are distributed throughout the active tablet area. As will be observed, the fibers are divided up into groups or segments of 6 fibers each (4 segments only are shown). In each segment, the fibers 25 have different lengths within the active area, ranging from the longest 25a to the shortest 25f. As a result, the fiber ends 32a–32f, also shown by the xs, are located in a pattern in which the end location points or spots are spaced from one another and are substantially uniformly distributed throughout the active area 17. If light were now introduced at the free ends 28 of the fibers, the light would propagate down the fibers and exit at the ends 32a–32f. If now the light were directly upwardly to the surface, and the superstructure were clear, an observer would see a large number of uniformly-distributed light spots. For instance, for a 12 inch standard tablet size, assuming the use of fiber sheets in 0.5 inch widths with 17 fibers per sheet, approximately 24 sheets or a total of about 400 fibers could be used to cover the active area of such a tablet, and this would produce about 400 light spots distributed throughout the active area. In order to spread the light more evenly, various measures can be taken, which will be described below. A further feature of the invention is the mounting of the fibers and the means for directing the exiting light upward toward the working surface 11. This is illustrated in FIGS. 3 and 4.

Figure 3:
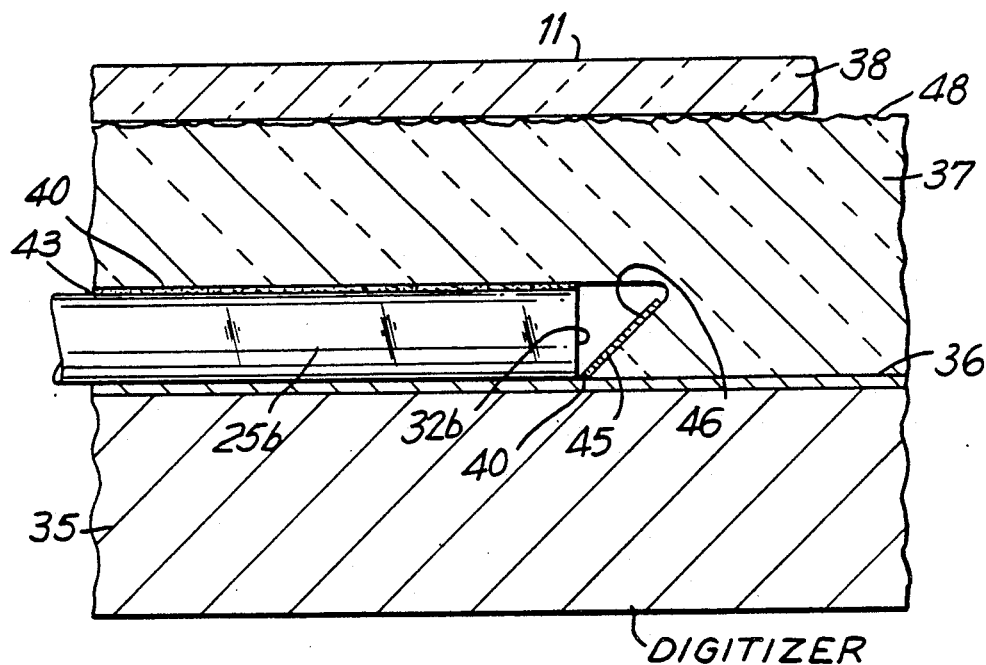
FIG. 3 is a schematic side view, partly in cross-section, showing the mounting of the optical fibers for the device of FIG. 2.

FIG. 3 is a cross-section through a portion of the upper part of the tablet, in the active area, schematically illustrating the fiber mounting. The substrate 35 shown and labelled digitizer comprises the usual electrode array (not shown), which is deposited as printed conductors on opposite sides of a printed circuit board, one side for the X-coordinate electrodes, and the opposite side for the Y-coordinate electrodes. On top of the digitizer 35 is provided a thin spacer 36, and on top of the latter is provided a thin optically clear or transparent spacer member 37. On top of the clear member 37 is located a thin optically translucent member 38. Thickness has been exaggerated for clarity. Typical thicknesses for the clear spacer 37 and translucent member 38 are about 0.375 inches and about 0.062 inches respectively. It should be remembered that the typical proximity height of a tablet is about one-half inch. The tablet will output valid coordinate data only when the pointing device is located within the proximity distance. Thus, the thicknesses of the various elements between the electrode array and the working surface 11 must, overall, be smaller than the useful proximity height of the tablet. Preferably this overall thickness amounts to about seven-sixteenths inches or less.

Figure 4:
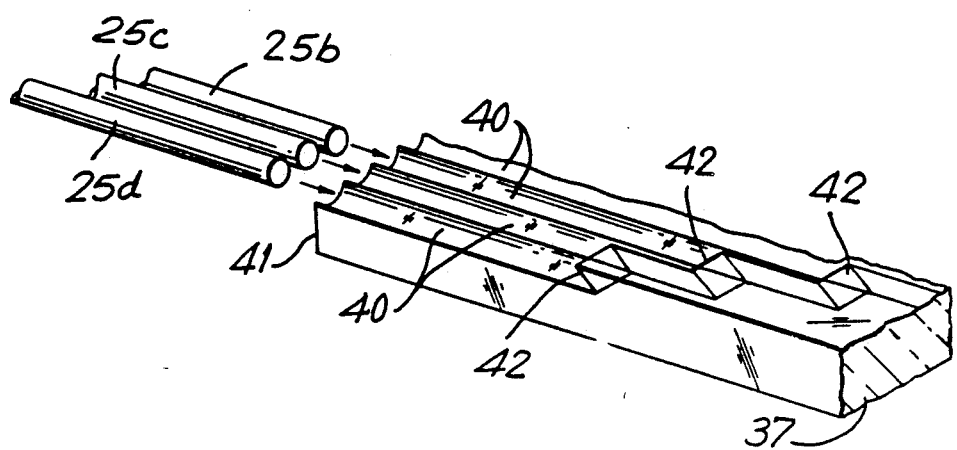
FIG. 4 is a perspective view of an intermediate step in the manufacture of the optical device of FIG. 3.

Referring now to FIG. 4, which is a view of the clear spacer 37 in an inverted position, a series of parallel grooves or slots 40 is provided along one surface of the spacer 37. Each groove extends inwardly from one side edge 41 of the spacer and extends different lengths along the surface. This figure illustrates three grooves or channels for receiving three end portions 25b, 25c, 25d of a fiber segment. The groove end is provided layer of adhesive 43 (not shown in FIG. 4) to the grooves, pushing the fiber ends as shown by the arrow into the grooves until they hit their respective stop 40, and holding in that position until the adhesive hardens, cementing the fibers into the grooves. The spacer 37 with assembled fibers 25 is then inverted and placed on the thin spacer 36, shown in FIG. 3.

The fiber stop 42 which assists in positioning each fiber in its respective channel 40 is constructed as an angled surface 45 (preferably at 45°), which is then made reflecting as by providing the surface with a metallized layer 46. Thus, that surface performs the dual function of locating the fiber ends at the correct site, and also functions to reflect the light exiting from the fiber end 32b up toward the working surface 11 of the tablet. The clear spacer 37 can easily be configured to provide the grooves 40 and angled surfaces 40, 45 by molding of a clear plastic such as an acrylic.

Various measures may be adopted to spread the light reflected upward. For instance, the thin spacer 36 underneath can be given a white surface finish to diffuse any incident light and to provide a good background for the user. The top surface 48 of the spacer can be roughened to help diffuse the light. This is easily achieved by sand-blasting that surface before introducing the fibers. In addition, the translucent member 38 on top greatly assists in diffusing the light to avoid uneven lighting of the surface.

Figure 5:
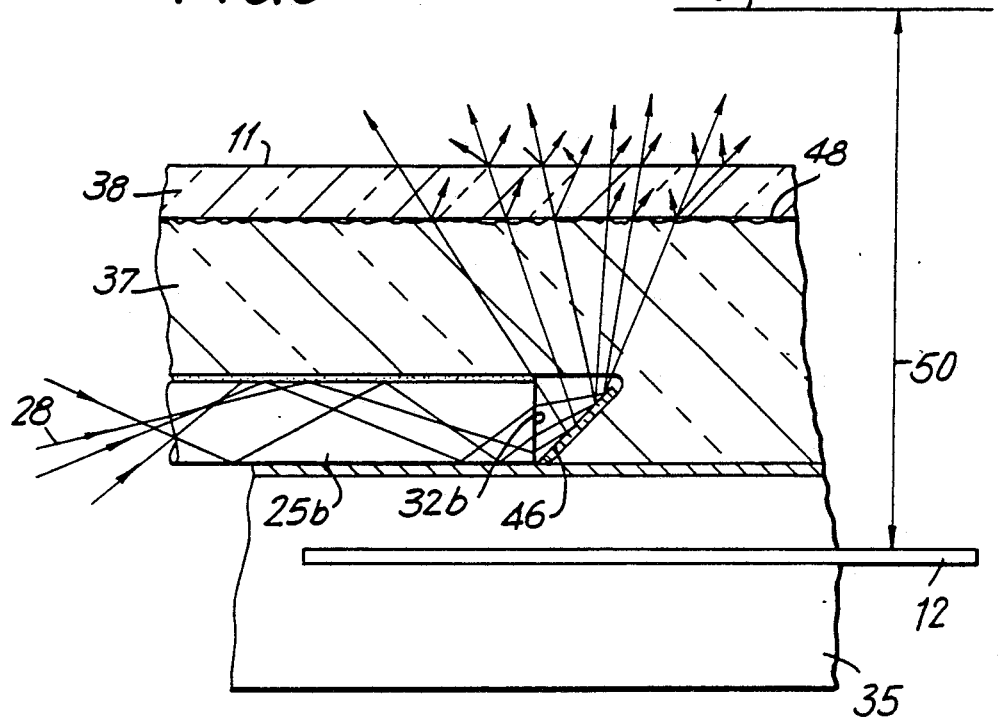
FIG. 5 is a view similar to that of FIG. 3 illustrating operation of a tablet in accordance with the invention.

FIG. 5 illustrates the operation. When light 28 is introduced into the free end (not shown) of the fibers, the light propagates by multiple total reflections down the fiber and exits from the end 32b adjacent the reflective surface 46. The light is reflected upward, shown by the arrows, and is spread and diffused by the roughened surface 48 and the translucent plate 38. The grid array is shown schematically at 12. The line 49 represents the proximity height for the stylus or cursor above the tablet surface, determined by the distance 50 to the grid. The use of optical fiber sheets with virtually negligible thickness allows the use of very thin members 37 and 38 and thus the depth of the grid below the tablet working surface 11 is not significantly greater than for a non-lighted surface tablet.

The embodiment illustrated in FIGS. 3–5 is called a surfacelit digitizer because the light source is located above the electrode array between the latter and the tablet working surface. In the backlit digitizer, the light source is located below the electrode array, which is then generally formed on a transparent circuit board to allow the light from below to pass through to the surface. Digitizer tablets also frequently employ a shield electrode located below the grids to direct the induction fields toward the surface. In the backlit tablet, the shield electrode is perforated to allow light from below to pass through to the surface. See, for example, my copending application, Ser. No. 370,913, filed June 23, 1989. The optical device of the invention can also be used in a backlit digitizer by simply positioning the plate 37 with assembled fibers below the grid array. A feature of the invention in this application is that, since the light source is a multiplicity of essentially point sources, the latter can be located under and aligned with the perforations or holes in the shield electrode so that little light is wasted. This embodiment is illustrated in FIG. 8.

Figure 8:
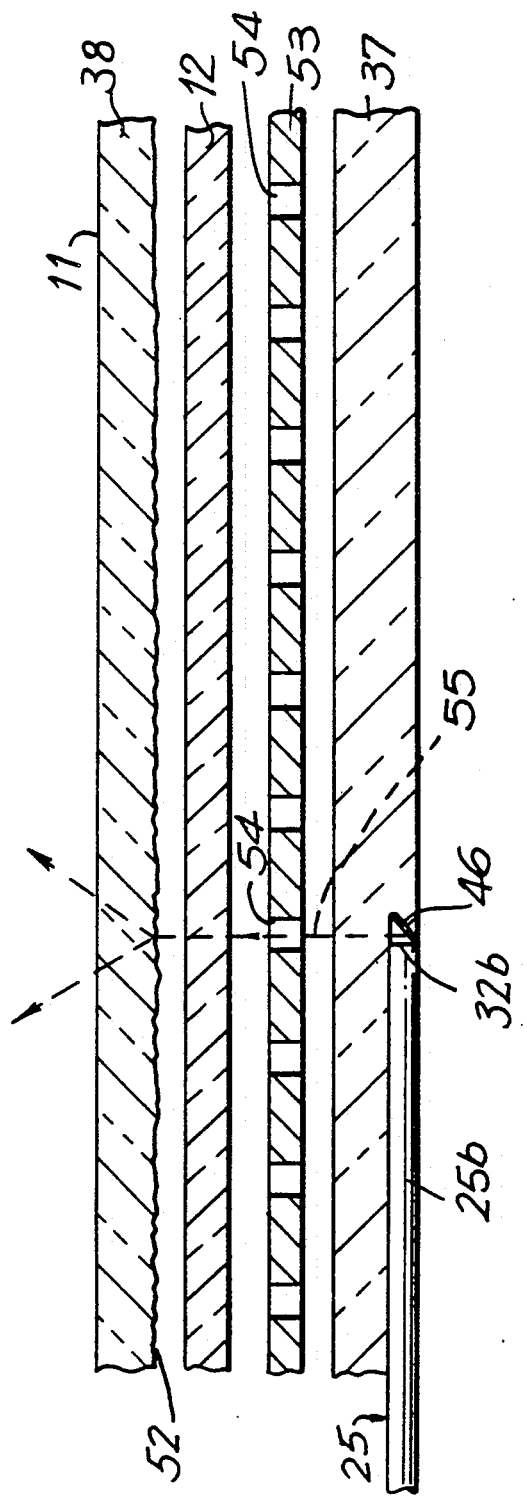
FIG. 8 is a schematic cross-section of a backlit digitizer in accordance with the invention.

In FIG. 8, the various layers have been shown separated for clarity. Normally, they would abut one another. The electrode array 12 (the deposited conductors are not shown) is located below the top translucent plate 38, whose bottom surface 52 has been roughened to assist in spreading the light. Below the grid 12 is located a perforated shield electrode 53 with holes 54. The plate 37 with assembled fibers 25 is located below the shield electrode 53. Each of the fiber ends 32 can be positioned so as to lie under one of the holes 54 in the shield electrode. Or conversely, the holes 54 distributed to be over the fiber ends. This light indicated by 55 can pass directly through the hole 54 in its path to the surface 11 of the tablet. The backlit arrangement would be preferred for those situations in which more accuracy is needed and thus a smaller proximity level. An advantage of the geometry illustrated, compared with that described in my earlier co-pending application, is that a layer structure results in which pole-type or discrete supports for a large tablet top are unnecessary. Thus, a relatively slim and lightweight digitizer results. For the backlit embodiment, larger diameter optical fibers can be used to provide more light. Also, a wider spacing of the fiber ends can also be employed.

The supply of light to the free ends of the fibers is straightforward. The free ends of the fibers can be bundled together (the fiber is flexible) to form a single or multiple large groups, and a single bright light source, such as a halogen lamp, used to illuminate the ends of the fibers. This is illustrated schematically in FIG. 2, which shows the free ends 56 bundled together and positioned adjacent an intense light source 57. The flexibility of the fibers allows them, after being brought out from the side edge of the plate 37, to be bent around and thus conveniently located in a free space within the housing. Of course, care must be taken to ensure that the bends do not cause the incident light to leak from the fibers. The distribution of the fibers in segment groups readily allows, as shown, the fiber ends and reflectors to be substantially equally spaced from one another for more light uniformity. Thus, in the preferred arrangement, the x and y spacings indicated by numerals 58 are substantially the same. It is preferred that the fibers extend along one of the coordinate axes of the tablet. Since, typically, more space is available in the housing at its upper edge, it is preferred for the fibers to extend into the plate 37 from its top edge and thus extend parallel to the y-axis. It is also within the contemplation of the invention for the fibers to enter the plate 37 from opposite sides, which would allow a larger spacing between the channels.

In the embodiments so far described, light is pumped into the free ends of the fibers located outside the outside area, and the light exits the fibers within the active area to illuminate the upper plane or working surface of the tablet. It will be appreciated that the optical fiber is symmetrical, meaning that light directed downward from the working surface will be reflected into the ends 32 and will propagate down the fiber and exit from its free ends 56. Thus, if the particular fiber which outputted the most light could be identified, then the position of the source of light over the fiber ends under the tablet surface could be determined. This would not make for a particularly attractive substitute for the current electromagnetic technology because the resolution would be poorer. However, it makes for an attractive menu-picking function, where the menu spots are relatively large areas on the overlay. Thus, in this embodiment of the invention, the arrangement depicted in FIGS. 2-5 would remain the same. The main differences would be that the pointing device 13 would, in addition, be provided with a light pen capacity, by simply inserting a small light source in the barrel, and making the point transparent. The light thus could readily pass through the hole of the inductor coil and could be directed downward. In this instance, the top plate preferably is transparent, since any light generated above by a light pen should not be diffused or spread as it passes downward through the tablet to the fiber ends below. It is of course understood that the light pen need not be incorporated into the cursor or stylus but can be provided as a separate implement.

In use, the user places the menu-carrying transparent overlay on the working surface of the tablet while it can be in its normal coordinate-generating mode. The user then activates the light pen while positioning the point over the menu choice desired. The light beam travels downward, will be reflected off the angled surface and pass into the fiber end 32b, and then propagate along the fiber to its free end. Means now have to be provided to identify the fiber from which light now emerges, which would unambiguously identify the location of the light pen when activated and thus the menu choice.

Figure 6:
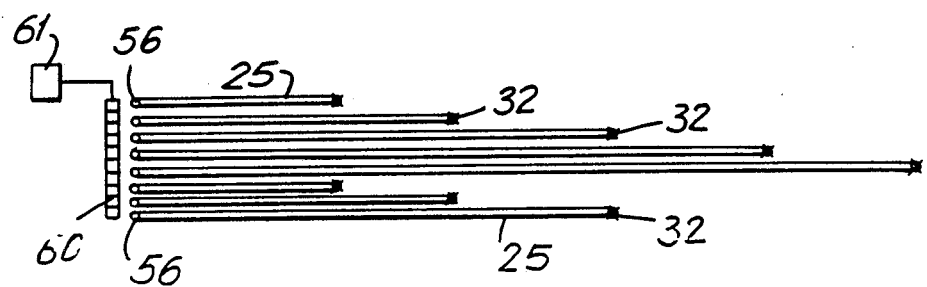
FIG. 6 illustrates, schematically, a tablet in accordance with the invention wherein the optical device is used for menu-picking.

There are various known ways to determine the fiber emitting light. One known way is to use a linear array of photoelectric detectors. Preferably one such array is provided for each fiber segment in sheet form. Such linear photodetector arrays are commercially available, as is suitable electronics to scan along the array to determine the detector generating the highest photocurrents. In this application, precision is not needed, since the typical menu spot size for the user will cover or overlie several angled surfaces 45. FIG. 6 illustrates an embodiment for this aspect of the invention for several fibers 25 whose ends 32, marked by the Xed circles, are distributed under the tablet working surface, and whose free ends 56, brought out from under the electrode area, are arranged in a line facing a linear array of photodetectors 60 connected to conventional scanner circuitry 61. Other optical arrangements will be evident to those skilled in this art.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A digitizer comprising:
   (a) a digitizer tablet having a generally planar top surface, edge surfaces, and electrodes extending substantially in a plane parallel to and below said surface, said electrodes defining substantially an active rectangular area aligned with X and Y axes of a rectangular coordinate system,
   (b) a pointing device connected to the tablet and cooperating with the electrodes, when activated, to generate electrical signals representative of X and Y coordinate positions of the location of the pointing device with respect to said active area,
   (c) means for surface lighting the tablet, said surface lighting means comprising:
   i. a plurality of substantially parallel optical fibers having end portions extending substantially in a plane parallel to the tablet top surface and located between the latter and the electrodes, said end portions having different lengths such that the optical fiber ends terminate at positions under the active area that are substantially uniformly spaced and distributed throughout the active area under the tablet surface, ii. optical means at each of the terminating end positions of the optical fibers to direct light emanating from each of the optical fibers upward toward the tablet top, iii. a flat optically translucent layer extending throughout the active area over the optical fiber plane whereby light emanating from the fiber ends is diffused laterally, iv. means for introducing light into the optical fibers at positions remote from their terminating ends.

2. A digitizer as claimed in claim 1, wherein the tablet has a given proximity threshold value determining the maximum distance the stylus can be positioned from the tablet surface before it stops generating coordinate data, the thickness of the elements extending between the electrodes and the tablet top surface being smaller than said maximum distance.

3. A digitizer as claimed in claim 2 wherein the maximum distance is of the order of one-half inch, and the thickness of the elements is seven-sixteenths inch or less.

4. A digitizer as claimed in claim 1 wherein the overall thickness of the surface lighting means is less than the overall thickness of the tablet.

5. A digitizer comprising:
(a) a digitizer tablet having a generally planar top surface, edge surfaces, and electrodes extending substantially in a plane parallel to and below said surface, said electrodes defining substantially an active rectangular area aligned with X and Y axes of a rectangular coordinate system,
(b) a pointing device connected to the tablet and cooperating with the electrodes, when activated, to generate electrical signals representative of X and Y coordinate positions of the location of the pointing device with respect to said active area,
(c) means for back lighting the tablet, said back lighting means comprising:
 i. a plurality of substantially parallel optical fibers having end portions extending substantially in a plane parallel to the tablet top surface and located on the side of the electrodes remote from the tablet top, said end portions having different lengths such that the optical fiber ends terminate at positions under the active area that are substantially uniformly spaced and distributed throughout the active area under the tablet surface,
 ii. optical means at each of the terminating end positions of the optical fibers to direct light emanating from each of the optical fibers upward toward the tablet top,
 iii. a flat optically translucent layer extending throughout the active area over the optical fiber plane whereby light emanating from the fiber ends is diffused laterally,
 iv. means for introducing light into the optical fibers at positions remote from their terminating ends.

6. A digitizer as claimed in claim 5, wherein the tablet further comprises a shield electrode having holes and located under the electrodes, the optical fiber ends terminating at positions substantially aligned with holes in the shield electrode.

7. A digitizer comprising:
(a) a digitizer tablet having a generally planar top surface face and electrodes extending substantially in a plane parallel to and below said surface, said electrodes defining substantially an active rectangular area aligned with X and Y axes of a rectangular coordinate system,
(b) a pointing device connected to the tablet and cooperating with the electrodes, when activated, to generate electrical signals representative of X and Y coordinate positions of the location of the pointing device with respect to said active area,
(c) means for lighting the tablet top surface, said lighting means comprising:
 i. a plurality of substantially parallel optical fibers having ends portions extending substantially in a plane parallel to the tablet top surface, said end portions having different lengths such that the optical fiber ends terminate at positions under the active area that are substantially uniformly spaced and distributed throughout the active area under the tablet surface,
 ii. optical means at each of the terminating end positions of the optical fibers to direct light emanating from each of the optical fibers upward toward the tablet top,
 iii. a flat optically transparent or translucent first layer, said first layer having an opening extending in from a side edge, said opening being configured to receive via said side edge said plurality of optical fibers, said upward-directing optical means being located in said opening remote from said side edge,
 iv. means for introducing light into the optical fibers at positions remote from their terminating ends.

8. A digitizer as claimed in claim 7, wherein said opening in the first layer comprises a plurality of side-by-side grooves or slots each sized to accommodate one of the optical fibers.

9. A digitizer as claimed in claim 8, wherein each groove or slot terminates adjacent the fiber terminating end positions.

10. A digitizer as claimed in claim 9, wherein said upwarding directing optical means comprises a reflecting surface at a groove or slot end.

11. A digitizer as claimed in claim 7, wherein the first layer is transparent, and the flat translucent layer comprises a second layer extending over the first layer.

12. A digitizer as claimed in claim 11, wherein a white surface is provided underneath the first layer between the latter and the electrodes.

13. A digitizer as claimed in claim 12, wherein the slots or grooves are located along the bottom side of the first layer.

14. A digitizer as claimed in claim 13, wherein the surface of the first layer opposite to its bottom side is provided with a rough surface.

15. A digitizer as claimed in claim 14, wherein the rough surface is a sand-blasted surface.

16. An optical fiber device for use with a digitizer tablet comprising:
(a) an optically transparent or translucent member having a generally plate-like configuration and top and bottom surfaces, said top surface having a generally rectangular active area defined by coordinates of a two coordinate system, said plate-like member having on its bottom surface a plurality of channels, each channel extending from an edge of the plate-like member and terminating at an optical spot underneath the active area, the optical spots for each of the channels being spaced from the optical spots of the other channels and being distributed substantially uniformly underneath the active area, (b) a sheet of optical fibers, each of said optical fibers having one end positioned in one of said plate-like member's channels and extending to the vicinity of its terminating optical spot and an opposite end, (c) means at the opposite end of each of said optical fibers for supplying light thereto or for detecting light therefrom.

17. The device of claim 16, wherein reflecting means are provided at the terminating end of each of the channels, said reflecting means being positioned so as to cause light incident thereon to be bent at an angle of approximately 90°.

18. The device of claim 16, wherein the plate-like member is subdivided into a plurality of segments each containing a plurality of channels of different length.

19. The device of claim 18, wherein substantially all of the segments contain the same number of channels.

20. The device of claim 19, wherein the channels of each segment terminate at optical spots distributed across the tablet active area along one coordinate axis.

21. The device of claim 16, in combination with a digitizer tablet having an electrode array, said optical fiber device being between the electrode array and the top surface of the optical member and serving to surface-light said top surface when light is supplied to the optical fibers.

22. The device of claim 16, in combination with a digitizer tablet having an electrode array, said optical fiber device being located under the electrode array and serving to back-light said top surface when light is supplied to the optical fibers.

23. The device of claim 16, in combination with a digitizer tablet having an electrode array and a pointing device which in cooperation with the electrode array serves to determine electronically the position of the pointing device over the tablet, a light detector positioned to receive light emanating from the free ends of the optical fibers, a menu-picking member having means to generate a light spot, and means connected to the light detector for determining the position of the menu-picking member when positioned over the tablet and activated to generate a light spot directed toward the optical device.

24. A digitizer comprising:
(a) a digitizer tablet having a generally planar top surface and electrodes extending substantially in a plane parallel to and below said surface, said electrodes defining substantially along their edges an active rectangular area aligned with X and Y axes of a rectangular coordinate system,
(b) a pointing device connected to the tablet and cooperating with the electrodes, when activated, to generate electrical signals representative of X and Y coordinate positions of the location of the pointing device with respect to said active area,
(c) a flat optically transparent or translucent layer over and substantially covering said electrodes, said pointing device being positioned on or over the surface of the optical layer remote from the tablet surface,
(d) an optical fiber device extending under the optical layer and having optical fiber light-receiving ends distributed throughout the active area,
(e) light-detecting means located to receive light emerging from the free ends of the optical fibers,
(f) means connected to the light-detecting means for determining which optical fiber has received light,
(g) a menu-picking member comprising means for generating a light spot under control of a user.

25. A digitizer tablet comprising an electrode array, an optical array, and pointing device means, said pointing device means including:
(a) electronic means for cooperating with the electrode array for electronically determining pointing device position over the tablet,
(b) light generating means for cooperating with the optical array for determining pointing device position over the tablet.

26. The tablet of claim 25, wherein the means of (a) comprises means for generating X-Y coordinate data of the pointing device position, and the means of (b) comprises menu-picking responsive means.

* * * * *

UNITED STATES PATENT AND TRADEMARK OFFICE
CERTIFICATE OF CORRECTION

PATENT NO. : 5,001,306

DATED : March 19, 1991

INVENTOR(S) : Alexander M. Purcell

It is certified that error appears in the above-identified patent and that said Letters Patent is hereby corrected as shown below:

Column 6, line 2, after "provided" insert --with a stop 42. The unit 13 assembled by applying a thin--.

Signed and Sealed this

Ninth Day of November, 1993

*Attest:*

BRUCE LEHMAN

*Attesting Officer*  *Commissioner of Patents and Trademarks*